United States Patent [19]

Limb

[11] 4,412,326
[45] Oct. 25, 1983

[54] COLLISION AVOIDING SYSTEM, APPARATUS AND PROTOCOL FOR A MULTIPLE ACCESS DIGITAL COMMUNICATIONS SYSTEM INCLUDING VARIABLE LENGTH PACKETS

[75] Inventor: John O. Limb, Berkeley Heights, N.J.

[73] Assignee: Bell Telephone Laboratories, Inc., Murray Hill, N.J.

[21] Appl. No.: 314,489

[22] Filed: Oct. 23, 1981

[51] Int. Cl.³ .............................................. H04J 6/00
[52] U.S. Cl. ...................................... 370/85; 370/92; 340/825.5
[58] Field of Search ........................... 370/85, 94, 92; 340/825.5, 825.51

[56] References Cited

U.S. PATENT DOCUMENTS

| | | | |
|---|---|---|---|
| 3,851,104 | 11/1974 | Willard et al. | 370/84 |
| 3,878,512 | 4/1975 | Kobayashi et al. | 370/85 |
| 4,063,220 | 12/1977 | Metcalfe et al. | 340/147 |
| 4,210,780 | 7/1980 | Hopkins et al. | 370/85 |
| 4,234,952 | 11/1980 | Gable et al. | 370/85 |
| 4,292,623 | 9/1981 | Eswaran et al. | 340/147 |
| 4,332,027 | 5/1982 | Malcolm | 370/85 |
| 4,337,465 | 6/1982 | Spracklen et al. | 370/85 |

OTHER PUBLICATIONS

"Bidirectional Token Flow System", by M. E. Ulug et al., Proceedings of the Seventh Data Communications Symposium, Oct. 27–29, 1981, pp. 149–155.
"Analysis of an Ethernet-Like Protocol", by Agrawala et al., Proceedings of Computer Networking Symposium, Dec. 15, 1977, pp. 104–111.
"Evaluation of Collision Control Algorithms in Ethernets", by Moura et al., Sixth Data Communications Symposium, Nov. 27–29, 1979, pp. 82–86.
"The Behavior of Ethernet-Like Computer Communications Networks", by Aimes et al., Proceedings of the Seventh Symposium on Operating Systems Principles, Dec. 10–12, 1979, pp. 66–81.

*Primary Examiner*—Douglas W. Olms
*Attorney, Agent, or Firm*—Richard J. Roddy

[57] ABSTRACT

A communications path having at least two stations coupled thereto. During time intervals when no station on the path has a packet to transmit, start-of-cycle packets for timing and synchronizing the stations are routinely transmitted between respective ends of the path. When a station has a packet of information to transmit, the station monitors the path for detecting whether or not the path is busy. On the one hand, if the path is not busy, a predetermined delay is introduced before the station is permitted to transmit a packet. The delay is related to the electrical distance between the station, which has the packet to transmit, and a station, which priorly transmitted a packet including a start-of-cycle packet. Also, the delay begins when the priorly transmitted packet is received by the station. On the other hand, if the path is busy, the station monitors the path until the path becomes not busy at which point the predetermined delay is introduced, the delay being related to the electrical distance between the station and that station which caused the path to be busy. On either hand, at the expiration of the delay and if the path has remained not busy during all of the predetermined delay, the station then transmits its packet; otherwise the station does not transmit its packet until a subsequent cycle. Thereby collisions are avoided and variable length packets are transmitted and received.

21 Claims, 7 Drawing Figures

COLLISION AVOIDING SYSTEM, APPARATUS AND PROTOCOL FOR A MULTIPLE ACCESS DIGITAL COMMUNICATIONS SYSTEM INCLUDING VARIABLE LENGTH PACKETS

TECHNICAL FIELD

This invention relates to communications arrangements and, more particularly, to multiple access digital communications systems, apparatus, and protocols for use therein.

BACKGROUND OF THE INVENTION

In the early days of the telephone art, use of the telephone was often confined to communications among users within a local geographic area. As a result and over the years, the economies related to accessing a communications system have lead to telephones in a local area usually being interconnected through a central controller, often called a local central office in the art.

As digital computers came upon the scene, another local community of use was discernible. Hence, a central controller is commonly employed for interconnecting various user terminals. For example, U.S. Pat. No. 3,851,104; entitled "Digital Communications System" and issued Nov. 26, 1974; discloses a time division, multiple access communications system which, under the control of a central terminal, provides communication links among a plurality of user terminals by way of a single communications signal path.

As the digital computer art advanced, parallel advances in the semiconductor art have lead to smaller, relatively inexpensive computers. With the advent of such smaller computers, the technique of central control is being abandoned in favor of a distributed control technique. Also, because of the usually bursty nature of digital information, the recent trend has also been toward communications systems having a capability for handling packets of digital information. One such distributed control communications system is disclosed in U.S. Pat. No. 4,063,220; entitled "Multipoint Data Communication System with Collision Detection" and issued Dec. 13, 1977. Indeed, the '220 patent discloses a communications system in which, when a terminal is to start an intended transmission on a communications path, a phase decoder detects the presence of other transmissions on the path and, responsive thereto, delays the intended transmission until no other transmissions are sensed. Once a transmission has started, if an interference (or collision) therewith is detected, a random number generator is used to select an interval of time at the completion of which a retransmission of the packet will take place.

Collisions being a problem, efforts exist in the art toward providing communication protocols for mitigating the deleterious effects of collisions. Unfortunately, the efficiency related to known multiple access digital communications system protocols tends to decrease as the digital signal bit rate increases, e.g., in a range of about 50-to-200 megabits per second.

SUMMARY OF THE INVENTION

This and other problems are solved in accordance with the principles of the instant invention in which improved station apparatus and a protocol for use therein as well as for use in a communications system may be employed both to avoid collisions on a communications path and to improve the efficiency of the path at relatively high digital bit rates. A station which is adapted to be coupled to the communications path includes an arrangement for writing a signal on the path and an arrangement for reading a signal from the path. According to one aspect of the instant invention, during time intervals when no station on the path has a packet to transmit, start-of-cycle packets for timing and synchronizing the stations are routinely transmitted between respective ends of the path. According to another aspect of the instant invention, when a station has a packet of information to transmit, the station monitors the path for detecting whether or not the path is busy. On the one hand, if the path is not busy, a predetermined delay is introduced before the station is permitted to transmit a packet. The delay is related to the electrical distance between the station, which has the packet to transmit, and a station, which priorly transmitted a packet including a start-of-cycle packet. Also, the delay begins when the priorly transmitted packet is received by the station. On the other hand, if the path is busy, the station monitors the path until the path becomes not busy at which point the predetermined delay is introduced, the delay being related to the electrical distance between the station and that station which caused the path to be busy. On either hand, at the expiration of the predetermined delay and if the path has remained not busy during all of the predetermined delay, the station then transmits its packets. Thereby collisions are avoided and variable length packets are transmitted and received.

BRIEF DESCRIPTION OF THE DRAWING

The invention should become fully apparent when taken in connection with the following detailed description and accompanying drawing in which.

DETAILED DESCRIPTION

Figure 1:
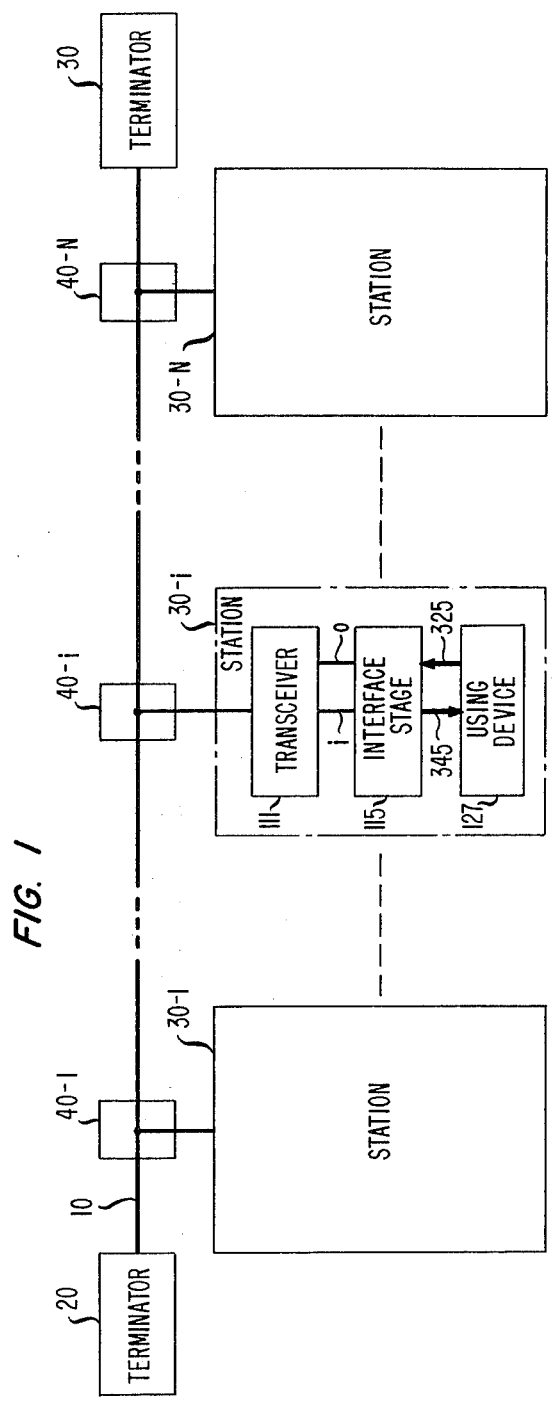
FIG. 1 illustrates a prior art arrangement including a plurality of stations interconnected with a communications path, which arrangement is useful in describing the principles of the invention.

Referring to the illustrative system structure shown in FIG. 1, which structure broadly parallels the structure disclosed in the aforecited U.S. Pat. No. 4,063,220, the teachings of which are herein incorporated by reference, bidirectional communications signal path 10 is illustrated as extended between terminators 20 and 30 and through each of a plurality of cascaded transmission couplers such as passive coupler 40-$i$. Bidirectional path 10 may be a conventional high frequency coaxial cable. Each of terminators 20 and 30 may be a conventional impedance matching device for limiting reflections. Each of couplers 40-$l$ through 40-N may be a conventional T-connector which is insertable in path 10 so that each respective one of stations 30-$l$ through 30-N is coupled to the communications link thereby formed, the coupling being through the respective transmission coupler. In particular, on the one hand, coupler 40-$i$ is for electrically coupling signals, representing, for example, packets of information, which signals are detected on communications path 10 and coupled to station 30-$i$. In that manner, station 30-$i$ may read (or receive) signals on communications path 10. On the other hand, coupler 40-$i$ is for coupling signals representing, for example, packets of information, which signals are to be transmitted from station 30-$i$ on communications path 10. In that manner, station 30-$i$ may write (or transmit) signals on communications path 10.

The structure illustrated in FIG. 1 need not include any electronics on path 10. Rather, the path could include only passive couplers. Thereby, the likelihood of the path becoming electrically opened is mitigated and its reliability is increased.

Alternatively, electronic amplifiers and the like may be included on path 10 for amplifying and compensating the path signals, e.g., in a system with a relatively long electrical path length. In such a system, responsive to the detection of an electrical open or other failure, one or more stations may be adapted to insert electrical terminator(s) thereby forming two or more separate paths to mitigate the deleterious effects of a failure.

Also, station 30-$i$ may include transceiver 111, interface stage 115, and, as a using device, station terminal equipment 127. In turn, terminal equipment 127 could include equipment such as a digital computer or a digital interface unit. The digital interface unit, for example, could be used for interconnecting path 10 with one or more other such paths, some of the other paths perhaps being geographically distant from the instant path.

As an aside, it is common in the art that, when the stations are electrically relatively close to each other, e.g., within about two miles of each other, such an arrangement is referred to as, among other things, a local communications network or as a local digital loop. Thus, in line with the structure illustrated in FIG. 1, a plurality of local networks may be interconnected for forming a still larger communications system.

As a further aside, it is well known that electrical signals, depending upon the electromagnetic transmission characteristics of the transmission medium, typically propagate on a communications path at a speed in the range 0.6 to 0.9 of the speed of light, which is estimated here to be about 186,000 miles per second. For ease of discussion, the estimated speed of light is here translated to an electromagnetic propagation speed of approximately one foot per nanosecond. Accordingly, it should be clear that path 10 may be busy at a station, e.g., at station 30-$i$, only while a packet is electrically being received or transmitted at the station; otherwise path 10 is not busy at least as to station 30-$i$. Thus, path 10 can be busy as to one station and not busy as to another station. As will shortly become clear, the instant protocol makes use of the foregoing to obtain some of the advantages related thereto.

Returning now to the illustrative embodiment, as to timing and synchronizing signals and apparatus on path 10, a start-of-cycle (SOC) packet may routinely be transmitted from a station at a first end of path 10, e.g., from station 30-$l$. The first end start-of-cycle packet may propagate down path 10 and eventually be received by a station at a second end of path 10, e.g., by station 30-N. Thereafter, the second end station, e.g., station 30-N, may routinely transmit a start-of-cycle packet. The second end start-of-cycle packet may propagate down path 10 and eventually be received by the first end station, e.g., station 30-$l$. The start-of-cycle packets continue to routinely propagate first from one end and then from the other end and hence between ends of path 10 until, as later described, a station has a packet to transmit.

Figure 2:
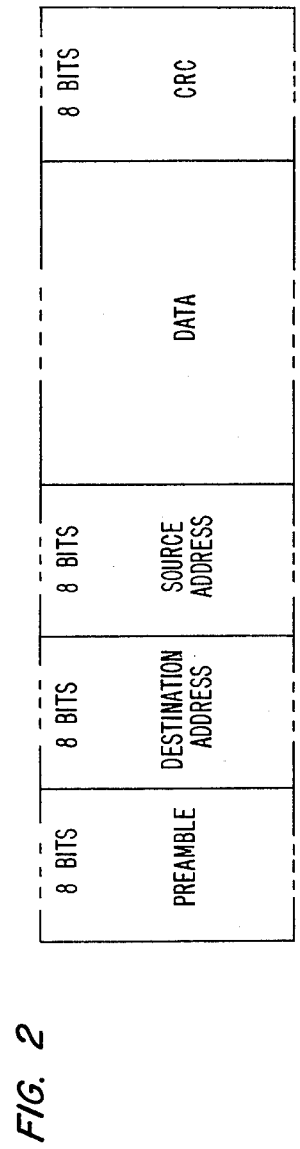
FIG. 2 illustrates a typical packet format useful in describing the principles of the invention.

A typical packet including the fields of the packet, the details of which are hereinafter described, is illustrated in FIG. 2. The first end start-of-cycle packet may include field(s) different than the field(s) included in the second end start-of-cycle packet. However, for brevity and not by way of limitation, the instant illustrative embodiment assumes each start-of-cycle packet may comprise a preamble field and a destination address field. Although it could also comprise some or all of the remaining fields in FIG. 2, for brevity and not by way of limitation, the instant illustrative embodiment assumes that it need not comprise any of the remaining fields in FIG. 2. Thus, as to a start-of-cycle packet, the preamble field may include a synchronizing sequence responsive to which each respective station on path 10 may be timed and synchronized with the signals on path 10. The destination address field may include a first predetermined address for indicating the start-of-cycle packet as originating from the first end of path 10, e.g., from station 30-$l$, and may include a second predetermined address for indicating the start-of-cycle packet as originating from the second end of path 10, e.g., from station 30-N. Thereby, intermediate stations on path 10 may, responsive to the first and the second predetermined addresses, not only determine that the received packet is a start-of-cycle packet but also determine from which end of path 10 the start-of-cycle packet originated.

Figure 3:
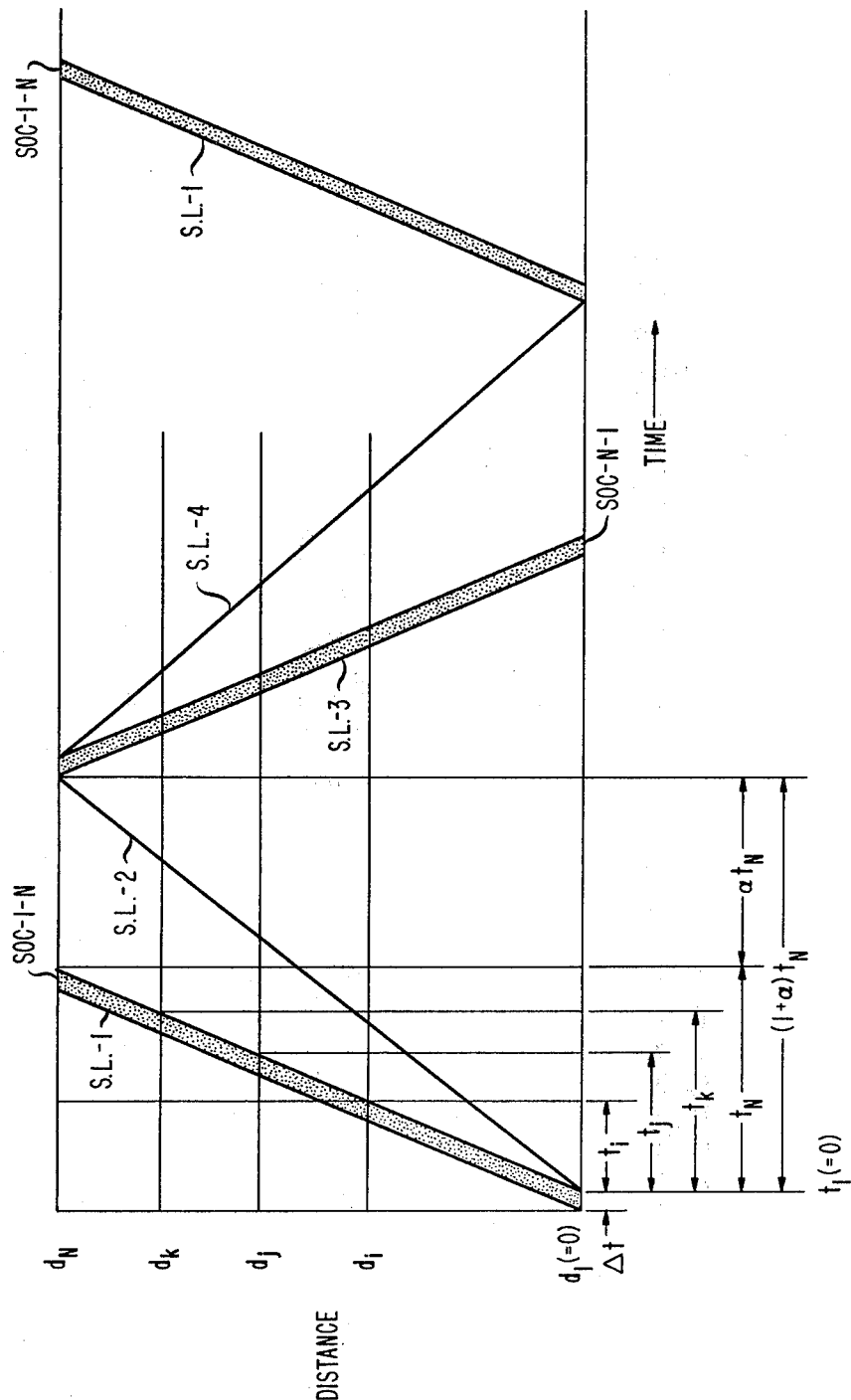
FIG. 3 graphically includes a time versus distance relationship for illustrating the propagation of a start-of-cycle packet between a first end and a second end of the communications path illustrated in FIG. 1.

More specifically, referring to FIG. 3, the therein illustrated time versus distance graph exemplifies the back-and-forth electrical flow or propagation of a start-of-cycle packet on the communications path of FIG. 1. Thus, if station 30-$l$ were to transmit a start-of-cycle packet, the packet could commence at an origin in FIG. 3 and require a time $\Delta t$ for its transmission. At the start of a cycle, the first end start-of-cycle packet (SOC-1-N) could propagate from station 30-$l$ on communication path 10 to be ultimately received by station 30-N. In the course of propagating down path 10, the start-of-cycle packet would pass station 30-$i$, which is a distance $d_i$ from station 30-$l$, at a time $t_i$ and would pass station 30-$j$, which is a distance $d_j$ from station 30-$l$, at a time $t_j$ and would pass station 30-$k$, which is a distance $d_k$ from station 30-$l$, at a time $t_k$ and would ultimately be received by station 30-N, which is a distance $d_N$ from station 30-$l$, at a time $t_N$. The aforedescribed propagation of the first end start-of-cycle packet is illustrated in FIG. 3 as the shaded area identified as SOC-1-N and having a positive slope labelled SL-1, which slope corresponds to the speed of the electromagnetic propagation of signals on the transmission medium, e.g., here to a speed of about one foot per nanosecond.

As an aside, it is convenient to define, by example, the terms "busy" and "not busy" as those terms may herein relate to path 10. As is clear from FIG. 3, some part of path 10 is in some sense busy from time zero through time ($t_N + \Delta t$). However, while some part of the path may be busy during that time interval, not all of the path is busy. This obtains because of the finite time for a signal to propagate down a path. For example, a start-of-cycle packet would begin passing station 30-$i$ at a time ($t_i - \Delta t$) and would pass station 30-$i$ at time $t_i$. Thus, as to station 30-$i$, path 10 is busy only during the time interval from ($t_i - \Delta t$) to $t_i$. In parallel fashion, the start-of-cycle packet would begin to pass station 30-$j$ at time ($t_j - \Delta t$) and would pass station 30-$j$ at time $t_j$. Thus, it may be noted in FIG. 3 that while the start-of-cycle packet is passing station 30-$j$, path 10 is not busy with respect to station 30-$i$.

Now assume that, after the first end start-of-cycle packet is received by station 30-N, i.e., at time $t_N$, a delay is introduced before a new cycle begins with the second end start-of-cycle packet being transmitted from station 30-N. The delay to be introduced is assumed to be a multiple, e.g., $\alpha$, of the time for the packet to electrically propagate from one end to the other end of the path, e.g., $t_N$, the resultant delay being $\alpha t_N$. Actually, the resultant delay would be $\alpha(t_N - t_1)$. However, for simplicity of discussion, assume $t_1$ equals zero. Accordingly, the time between the end of the transmission of the first start-of-cycle packet from station 30-$l$ and the beginning of the second start-of-cycle packet from station 30-N is identified in FIG. 3 as the product $(1+\alpha)t_N$ and is shown by a line having a positive slope SL-2.

In parallel fashion, the second end start-of-cycle packet is transmitted from station 30-N toward station 30-$l$. The second end start-of-cycle packet is illustrated in FIG. 3 as the shaded area identified as SOC-N-1 and having a negative slope labelled SL-3, which slope also corresponds to the speed of the electromagnetic propagation of the signals on the transmission medium. Finally, a delay is introduced before another first end start-of-cycle is transmitted from station 30-$l$. Accordingly, the time between the end of the transmission of the second start-of-cycle packet from station 30-N and the beginning of a first start-of-cycle packet from station 30-$l$ is also $(1+\alpha)t_N$ and is shown in relation to a line having a negative slope SL-4. Thus, as aforementioned, while communications path 10 is not being used to transmit "information" packets among the stations, start-of-cycle packets flow from a first end of the path to a second end of the path and, after a delay, from the second end of the path to the first end of the path. Responsive to the start-of-cycle packets, the various stations on path 10 may be timed and synchronized.

As to writing an "information" packet from a station, subsequent to the transmission of a start-of-cycle packet, one or more variable length packets of information may be transmitted on the path. Indeed, a packet may, for example, be transmitted as a time division multiplexed signal. However, absent a control protocol, collisions between the packets could occur. According to the principles of the instant invention, the instant control protocol may be used for controlling the signals on the path and for avoiding collisions. There being no collisions, there is no retransmission of a packet as in the known art.

As to the instant control protocol, FIG. 2 depicts an illustrative packet. For illustration, a packet is assumed to include a plurality of fields, each field including one or more bits. Here, a packet may comprise five fields. For example, the packet may, as is common in the art, include a preamble field for timing and synchronizing, here shown as including eight bits, a destination station address field for identifying the called station, here shown as including eight bits, a source station address field for identifying the calling station, here shown as including eight bits, a data field for inserting the "information" to be transmitted, here shown as including a variable number of bits, and an error control field for checking the packet, here shown as including eight bits. One error control field may include a well known cyclic redundancy code (CRC).

Figure 4:
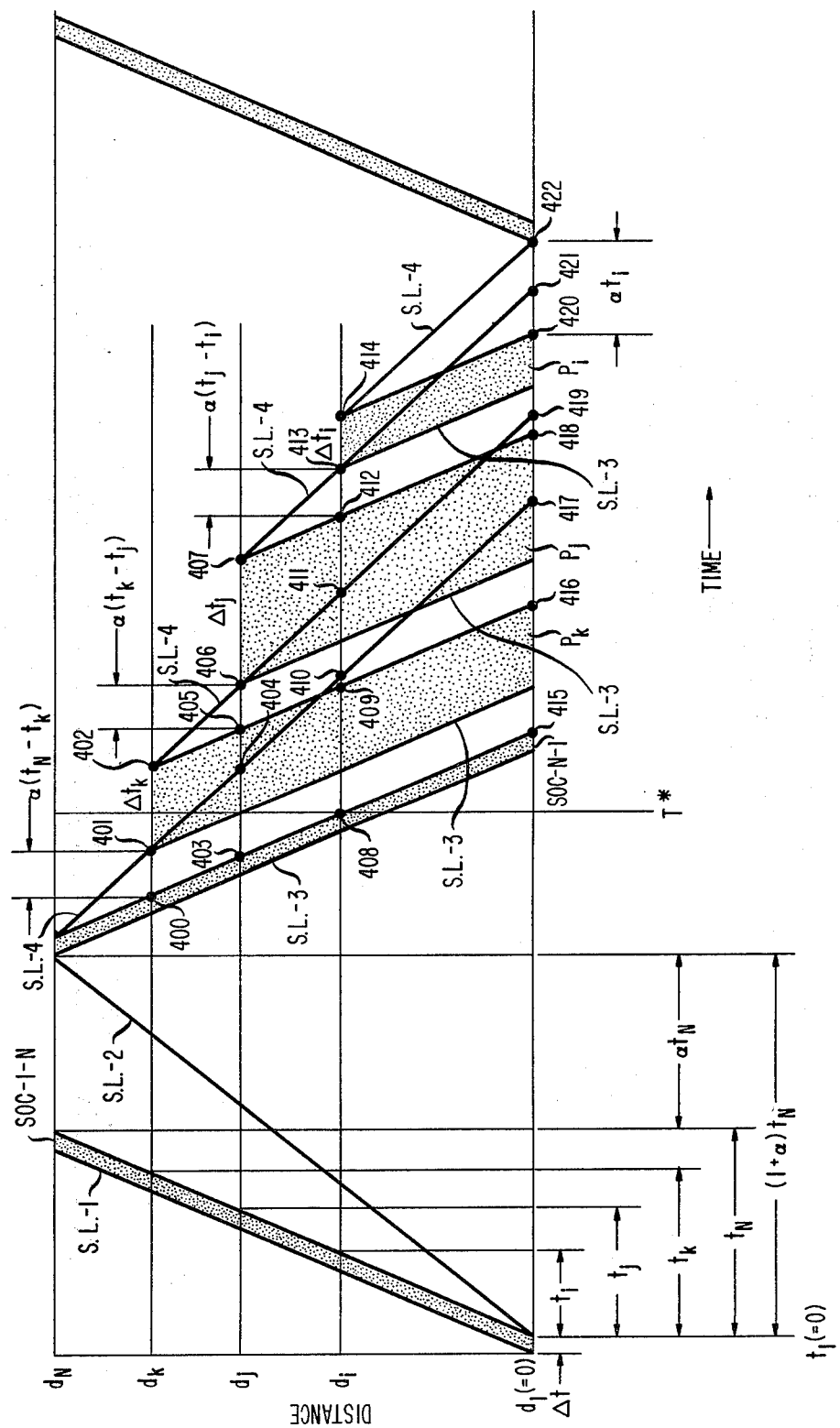
FIG. 4 repeats the time versus distance relationship of FIG. 3 as well as illustrates the propagation of a plurality of packets from a second end of the communications path illustrated in FIG. 1.

Referring to FIG. 4, it is assumed that a first end start-of-cycle packet is transmitted from station 30-$l$ and propagates toward station 30-N in a manner similar to that aforedescribed relative to FIG. 3. After the start-of-cycle packet is received by station 30-N in what now follows, we assume that a station has a packet to transmit. Notwithstanding and as before, station 30-N firstly transmits the second end start-of-cycle packet which propagates from station 30-N toward station 30-$l$. The second end start-of-cycle packet is illustrated in FIG. 4 as the shaded area identified as SOC-N-1. Now secondly, assume station 30-$k$ has a packet to transmit. Note that the second end start-of-cycle packet would propagate a distance ($d_N - d_k$) as well as pass station 30-$k$ after a time interval ($t_N - t_k$) and at a time identified in FIG. 4 at point 400, i.e., at which point path 10 goes from a busy state to a not busy state. In theory, since no other packet is then about pass station 30-$k$, i.e., as to station 30-$k$, path 10 is not busy, station 30-$k$ could transmit a packet. However, in accordance with the instant protocol, the packet to be transmitted is delayed within station 30-$k$ for a predetermined time equal to $\alpha(t_N - t_k)$, i.e., from point 400 until point 401. If, during the predetermined delay time interval $\alpha(t_N - t_k)$, there has been no transmission detected by station 30-$k$ on path 10, i.e., path 10 has been not busy during all of the predetermined time delay, station 30-$k$ may transmit its packet, which packet is identified in FIG. 4 as the shaded area $P_k$. Thus, packet $P_k$ begins being transmitted at point 401 and may take a time $\Delta t_k$ to be transmitted, i.e., until point 402. As an aside, note that packet $P_k$ propagates in a bidirectional manner on path 10, i.e., propagates from station 30-$k$ both toward station 30-$l$ and toward station 30-N. However, for brevity of discussion and description, only the propagation toward station 30-$l$ is described and illustrated.

Nextly, return to start-of-cycle packet SOC-N-1 and assume station 30-$j$ also has a packet to transmit. Note that the second end start-of-cycle packet would propagate a distance ($d_N - d_j$) during which a time interval ($t_N - t_j$) would elapse. In theory, after the second end start-of-cycle packet SOC-N-1 has passed station 30-$j$, i.e., at point 403 where path 10 goes from a busy state to a not busy state, station 30-$j$ may transmit its packet. However, in accordance with the instant protocol, the packet is delayed within station 30-$j$ for a first predetermined time interval equal to $\alpha(t_N - t_j)$, i.e., from point 403 until point 404 in FIG. 4. As station 30-$j$ monitors path 10, it detects that a packet has been transmitted during the first delay time interval $\alpha(t_N - t_j)$, i.e., path 10 is detected as busy during at least some of the predetermined time delay. Indeed, since packets are of the format illustrated in FIG. 2, station 30-$j$ can routinely read the source address field of each packet detected on path 10 for identifying the respective transmitting station, e.g., for identifying station 30-$k$ as the station from which packet $P_k$ was transmitted during the first delay time interval $\alpha(t_N-t_j)$. Accordingly, inasmuch as station 30-$j$ detects path 10 as busy, station 30-$j$ does not transmit its packet but rather delays a second predetermined time interval. In particular, packet $P_k$ would be detected by station 30-$j$ as having passed station 30-$j$ at a time identified as point 405. In theory, after point 405, station 30-$j$ could transmit a packet. However, in accordance with the instant protocol, station 30-$j$ having detected packet $P_k$ as having been transmitted from station 30-$k$, i.e., having read the source address field from the packet $P_k$ on path 10 for identifying station 30-$k$ as the transmitting station, station 30-$j$ delays transmission a second predetermined time interval $\alpha(t_k-t_j)$, i.e., from point 405 until point 406. It may be noted that point 406 is on a line starting from point 402 and having slope SL-4. If during the second delay $\alpha(t_k-t_j)$, station 30-$j$ has not detected a transmission on path 10, i.e., path 10 has been not busy during all of the predetermined time delay, then at point 406 station 30-$j$ may commence the transmission of its packet $P_j$. The packet from station 30-$j$ is identified as the shaded area $P_j$ and requires a time $\Delta t_j$ to be transmitted, i.e., from point 406 until point 407.

Nextly, return to start-of-cycle packet SOC-N-1 and assume station 30-$i$ also has a packet to transmit. In theory, after the second end start-of-cycle packet SOC-N-1 has passed station 30-$i$, i.e., at point 408, station 30-$i$ could transmit its packet, i.e., path 10 goes from a busy state to a not busy state.

As an aside, a vertical line labelled T* is included in FIG. 4 to illustrate, among other things, that while path 10 may not be busy as to station 30-$i$ at point 408, path 10 is busy as to station 30-$k$, it being noted that time T* occurs between points 401 and 402. Thus, the terms "busy" and "not busy", when herein applied to path 10 and to a station on path 10, should be understood to refer to that part of path 10 which is coupled to the station being referenced.

Continuing, the start-of-cycle packet has therefore propagated a distance $(d_N-d_i)$ during which a time interval $(t_N-t_i)$ has elapsed. However, in accordance with the instant protocol, the packet is delayed within station 30-$i$ for a first predetermined time interval equal to $\alpha(t_N-t_i)$, i.e., from point 408 until point 410 in FIG. 4. However, during the first delay $\alpha(t_N-t_i)$, i.e., between time points 408 and 410, station 30-$i$ detects that a packet had been transmitted. Indeed, in monitoring path 10, station 30-$i$ reads source address field packet $P_k$ for identifying station 30-$k$ as the station from which packet $P_k$ was transmitted. In particular, packet $P_k$ would be detected by station 30-$i$ as having passed station 30-$i$ at a time identified as point 409. In theory, after point 409, station 30-$i$ could transmit a packet, i.e., path 10 goes from a busy state to a not busy state. However, in accordance with the instant protocol, station 30-$i$ having detected packet $P_k$ would delay a second predetermined time interval $\alpha(t_k-t_i)$, i.e. from point 409 until point 411, point 411 being on the line with point 406, which line has slope SL-4. As station 30-$i$ monitors path 10, it detects that a packet has been transmitted from station 30-$j$ during the second delay interval of $\alpha(t_k-t_i)$. Accordingly, inasmuch as station 30-$i$ detects path 10 as busy, station 30-$i$ does not transmit its packet but rather delays a third predetermined time interval. In particular, packet $P_j$ would be detected by station 30-$i$ as having passed station 30-$i$ at a point identified as point 412. In theory, after point 412, station 30-$i$ could transmit a packet. However, in accordance with the instant protocol, station 30-$i$ having detected packet $P_j$ as having been transmitted from station 30-$j$ delays a third predetermined time interval $\alpha(t_j-t_i)$ before transmitting its packet, i.e., from point 412 to point 413. It should be noted that point 413 is on a line starting from point 407 and having slope SL-4. If during the third time interval $\alpha(t_j-t_i)$, station 30-$i$ has not detected a packet on path 10, then at point 413 station 30-$i$ may commence the transmission of its packet $P_i$ which packet takes a time $\Delta t_i$ for transmission, i.e., until point 414.

Nextly, return to start-of-cycle packet SOC-N-1 and assume no other station has a packet to transmit. In theory, after the second end start-of-cycle packet SOC-N-1 has passed station 30-$l$, i.e., at point 415, station 30-$l$ may transmit a first end start-of-cycle packet. However, in accordance with the instant protocol, the packet is delayed within station 30-$l$ for a first predetermined time interval equal to $\alpha t_N$, i.e., from point 415 to point 417 in FIG. 4. As station 30-$l$ monitors path 10, it detects that a packet has been transmitted during the first delay $\alpha t_N$, i.e., between the points 415 and 417. In particular, packet $P_k$ would be detected by station 30-$l$ as having passed station 30-$l$ at a time identified as point 416. In theory, after point 416, station 30-$l$ could transmit a packet. However, in accordance with the instant protocol, station 30-$l$ having detected packet $P_k$ would delay a second predetermined time interval $\alpha t_k$, i.e., from point 416 until point 419, point 419 being on the line with point 402 having slope SL-4. As station 30-$l$ monitors path 10, it detects that a packet has been transmitted from station 30-$j$ during the second delay interval $\alpha t_k$. In particular, packet $P_j$ would be detected by station 30-$l$ as having passed station 30-$l$ at a point identified as point 418. In theory, after point 418, station 30-$l$ could transmit a packet. However, in accordance with the instant protocol, station 30-$l$ having detected packet $P_j$ as having been transmitted from station 30-$j$ delays a third predetermined time interval $\alpha t_j$ before transmitting its packet, i.e., from point 418 to point 421, point 421 being on a line from point 407 having slope SL-4. As station 30-$l$ monitors path 10, it detects that a packet has been transmitted from station 30-$i$ during the third delay $\alpha t_j$. In particular, packet $P_i$ would be detected by station 30-$l$ as having passed station 30-$l$ at a point identified as point 420. In theory, after point 420, station 30-$l$ could transmit a packet. However, in accordance with the instant protocol, station 30-$l$ having detected packet $P_i$ would delay a fourth time interval $\alpha t_i$, i.e., from point 420 to point 422. If during the fourth time interval $\alpha t_i$, station 30-$l$ does not detect a packet on path 10, then at point 422, point 422 being on a line from point 414 having slope SL-4, the cycle ends and a new cycle begins, e.g., station 30-$l$ may commence the transmission of the first end start-of-cycle packet.

In summary, it should be clear from the foregoing that a packet $P_i$ is not transmitted from station 30-$i$ unless and until (1) station 30-$i$ waits a predetermined time interval after path 10 goes from a busy state to a not busy state, and (2) during the entire predetermined time interval, path 10 has remained in a not busy state.

Also, the illustrative predetermined time interval at station 30-$i$ is related to electrical distance between station 30-$i$ and the station which last caused path 10 to go from a busy state to a not busy state, e.g., as between station 30-$k$ and station 30-$i$, the predetermined time interval $\alpha(t_k - t_i)$ is related to the electrical distance $(d_k - d_i)$. Specifically, the predetermined time interval that station 30-$i$ waits begins after the packet from station 30-$k$ has passed station 30-$i$, i.e., as path 10 goes from a busy to a not busy state. At the expiration of the predetermined delay, station 30-$i$ begins to transmit its packet but only if station 30-$i$ detects path 10 as having remained in a not busy state during the entire predetermined delay.

Figure 5:
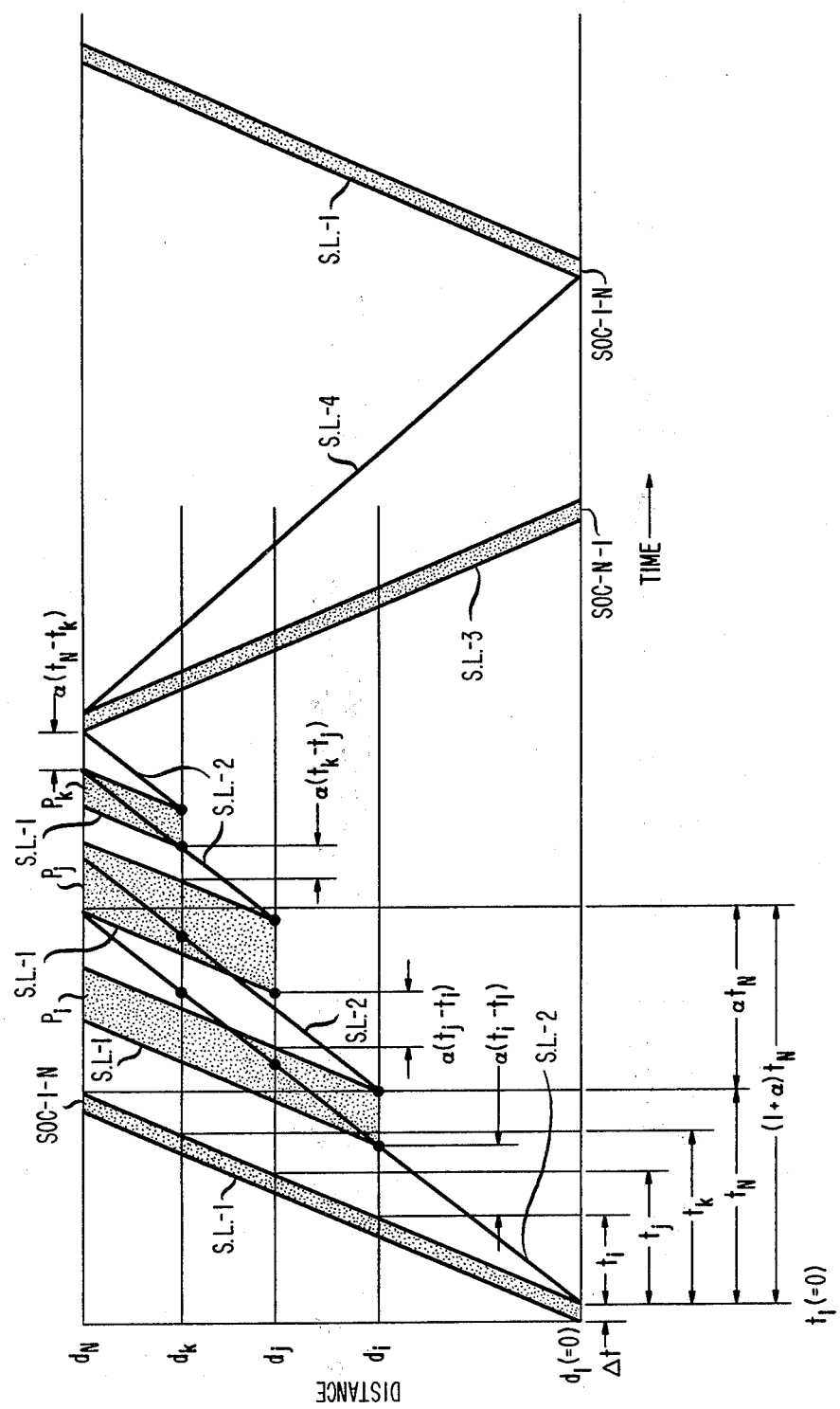
FIG. 5 repeats the time versus distance relationship of FIG. 3 as well as illustrates the propagation of a plurality of packets from a first end of the communications path illustrated in FIG. 1.

It should be noted that, with reference to FIG. 4, the shaded areas of packets P$_k$, P$_j$, and P$_i$ are shown with a negative slope illustrating the propagation of the respective packets from stations 30-$k$, 30-$j$ and 30-$i$ toward station 30-$l$. However, as noted, path 10 is a bidirectional path. Hence, packets P$_k$, P$_j$, and P$_i$ also propagate toward station 30-N. A corresponding packet having a positive slope is omitted from FIG. 4 in order to reduce the confusion that may result from an overly "busy" figure. As to the propagation of a packet toward station 30-N, reference is made to the example of FIG. 5, which figure is included but without the details attached to FIG. 4. Rather, the example of FIG. 5 is substantially the reverse of the example of FIG. 4 and should be clear to the ordinary artworker in light of FIG. 4.

Figure 6:
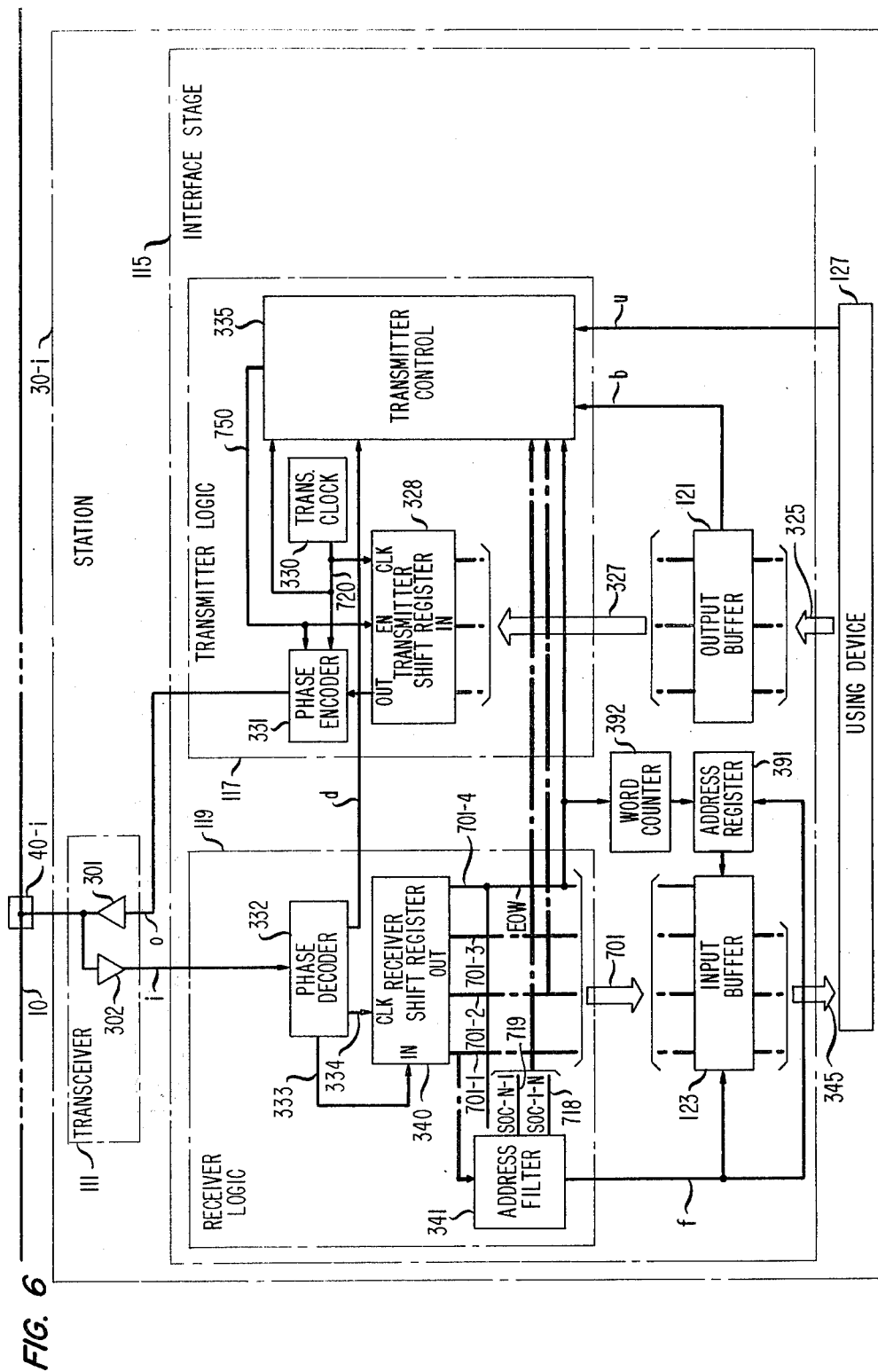
FIG. 6 illustrates station apparatus which may be included in each station of FIG. 1 and which is useful in describing the principles of the invention.
Figure 7:
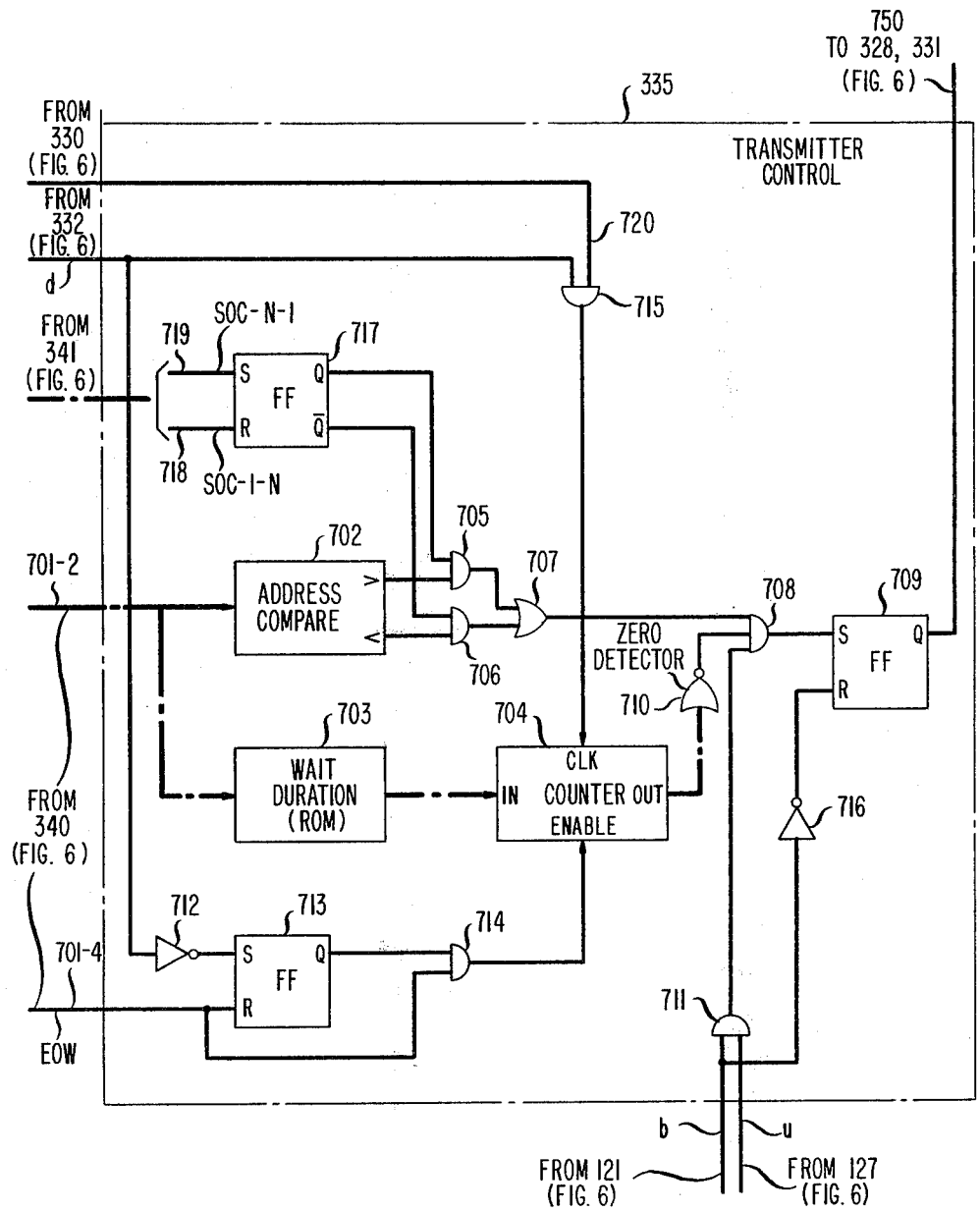
FIG. 7 illustrates transmitter control circuitry, which may be included in the station apparatus of FIG. 6 and which is useful in describing the principles of the invention.

Now attention is directed to illustrative apparatus for embodying the instant protocol such as that illustrated in FIGS. 6 and 7.

Firstly, assume that a start-of-cycle packet has been transmitted for timing and synchronizing each station. Thereafter, one or more data packets may be transmitted as a time division multiplexed signal. Each packet is assumed to have a format consistent with that illustrated in FIG. 2 and as aforedescribed.

Secondly, as also aforedescribed, coupler 40-$i$ electrically couples signals to and from station 30-$i$. Hence, as a packet is extended over path 10, it may be read by station 30-$i$ from path 10 by way of coupler 40-$i$ and written by station 30-$i$ on path 10 by way of coupler 40-$i$.

Thirdly, the coupled signals pass to station 30-$i$ and therein through and among transceiver 111, interface stage 115, and using device 127. For example, on the one hand, transceiver 111, which forms the front end of station 30-$i$, includes receiver 302 through which received signals are extended over input signal cable "i" to receiver logic 119 and thence over cable 701 through input buffer 123 over cable 345 to using device 127. On the other hand, using device 127 could extend a packet to be transmitted over cable 325 through output buffer 121 over cable 327 through transmitter logic 117 over output signal cable "o" through transceiver driver 301 to path 10.

More particularly, on the read side, signal "i" connects from transceiver 111 to phase decoder 332. Decoder 332 provides two separate signals, e.g., a data signal 333 and a received clock signal 334, to respective inputs of receive shift register 340, signal 333 being connected to a shift register data input and signal 334 being connected to a clock terminal of shift register 340. Predetermined outputs of shift register 340 are extended respectively to address filter 341 over cable 701-1, to transmitter control 335 over cable 701-2, and to input buffer 123 over cable 701-1, 701-2, 701-3 and 701-4, which together comprise cable 701. Thus, as a received packet is written into shift register 340, address filter 341 may monitor its destination address field (referring to FIG. 2) over cable 701-1. Responsive to the destination address field of the received packet identifying station 30-$i$ as the destination station, or called station, a logic one "f" signal is extended from an output of address filter 341 for enabling input buffer 123 to accept data from register 340 over cable 701; otherwise a disabling logic zero "f" signal is so extended. Digital buffer 123 may thereafter extend the data as its output over cable 345 to device 127.

As to transmitting, using device 127, which may include among other things a digital computer, extends a using device ready signal over signal lead "u" to transmitter control 335. Specifically, when using device 127 has a packet to transmit, it extends a logic one "u" signal to transmitter control 335 and otherwise extends a logic zero "u" signal. The packet to be transmitted is extended from using device 127 over cable 325 to output buffer 121. As to buffer 121, buffer signal "b" is connected from output buffer 121 to transmitter control 335 for indicating that buffer 121 is ready to transmit. Output buffer 121 extends the packet over cable 327 to transmitter logic 117 and therein to transmitter shift register 328. Responsive to clock signals from transmitter clock 330, data are extended from shift register 328 to phase encoder 331. Encoder 331 and shift register 328 are enabled by transmitter control circuit 335, the enabling being over lead 750. Encoder 331, in turn, provides the signal to be transmitted over lead "o" through driver 301 and thence to path 10.

Before describing transmitter control circuit 335, and for simplicity, assume each station 30-$l$ through 30-N on path 10 is identifiable by a respective binary address. Accordingly, the destination source and address fields of a packet may include a binary representation of the respective destination and source address. Further, assume that stations on path 10 are ordered with respect to electrical distance from each other. For example, station 30-$l$ is at the first end of path 10 and thereafter station 30-$(i-1)$ is electrically closer to the first end than is station 30-$i$.

As to the details of an illustrative transmitter control 335, reference may be made to FIG. 7. As priorly mentioned, the source address field can be extended from receive shift register 340 over cable 701-2 to transmitter control 335 and therein jointly to an input of address comparator 702 and to an input of wait duration read only memory 703. As to receiving station 30-$i$, the joint inputs may be the source address field of a transmitting station, for example, a source address for station 30-$k$, responsive to which a predetermined time delay $\alpha(t_k - t_i)$ is read from ROM 703 and is extended from an output of ROM 703 to an input of decrement counter 704. After the packet is received in shift register 340, an "eow" signal for indicating the receipt of the packet is extended from register 340 over cable 701-4 jointly to a reset input of flip-flop 713 and a first input of AND gate 714 responsive to which counter 704 is enabled to be loaded with the predetermined time delay from ROM 703.

A cable busy signal "d" is provided from phase decoder 332 for identifying whether or not path 10 is busy. Upon detection of path 10 being busy, phase decoder 332 extends a logic zero d signal to transmitter control 335. Upon detection of path 10 being not busy, phase decoder 332 so extends a logic one d signal. Within control 335, the cable busy signal d is extended jointly to an input of AND gate 715 and through inverter 712 to a set input of flip-flop 713. Responsive to pulses from transmission clock 330 being provided over lead 720 to a second input of AND gate 715, counter 704 is decremented.

Firstly, responsive to the detection of the expiration of the predetermined time delay, e.g., an all zero condition being detected at the output of counter 704 by way of NOR gate 710, a logic one is extended from NOR gate 710 to a first input of AND gate 708.

Now secondly, both buffer signal "b" for indicating that output buffer 121 is loaded and using device signal "u" for indicating that the using device is ready are extended through AND gate 711 to a second input of AND gate 708.

Now thirdly, as should be clear from the prior description relative from FIGS. 3, 4 and 5 and in accord with the instant protocol, when a start-of-cycle packet is provided from a first end of path 10 toward station 30-$i$, no other station on path 10 such as station 30-$j$ where j is greater than i may transmit a packet prior to station 30-$i$ transmitting its packet. Conversely, when a start-of-cycle packet is transmitted from the second end of path 10 toward station 30-$i$, no other station such as station 30-$k$ where k is less than i may transmit a packet prior to station 30-$i$ transmitting its packet. An embodiment of this aspect of the instant protocol is found by way of the combination of comparator 702, flip-flop 717, AND gates 705 and 706, and OR gate 707. In particular, responsive to the source address on cable 701-2, comparator 702 extends a logic one to a first input of AND gate 706 if the source address on cable 701-2 is less than the address of station 30-$i$. Otherwise, a logic zero is so extended. In parallel fashion, also responsive to the source address on cable 701-2, comparator 702 extends a logic one to a first input of AND gate 705 if the source address on cable 701-2 is greater than the address of station 30-$i$.

As priorly described, a start-of-cycle packet has a first predetermined destination address for indicating the start-of-cycle packet as originating from the first end of path 10, e.g., from station 30-$l$ and a second predetermined destination address for indicating the start-of-cycle packet as originating from the second end of path 10, e.g., from station 30-N. Accordingly, address filter 341 also functions for providing a logic one on lead 718 responsive to and for indicating the start-of-cycle packet as originating from the first end and otherwise for extending a logic zero on lead 718. In parallel fashion, address filter 341 also functions for providing a logic one on lead 719 responsive to and for indicating the start-of-cycle packet as originating from the second end and otherwise for extending a logic zero on lead 719. In that manner, address filter 341 provides an SOC-1-N signal over lead 718 to a reset input of flip-flop 717 and an SOC-N-1 signal over lead 719 to a set input of flip-flop 717. The Q output of flip-flop 717 is provided to a second input of AND gate 705 while the $\overline{Q}$ output of flip-flop 715 is provided to a second input of AND gate 706. As a result, a logic one is provided either from AND gate 705 or from AND gate 706 through OR gate 707 to a third input of AND gate 708 when the aforedescribed subconditions are met; otherwise a logic zero is so provided. Responsive to concurrence of the aforedescribed three conditions, flip-flop 709 is set to provide a transmit signal on lead 750 for enabling phase encoder 331 and, in particular, transmitter logic 117 to transmit a packet on path 10; otherwise a do not transmit signal for disabling phase encoder 331 is so provided.

Although the invention has been described and illustrated in detail, it is to be understood that same is by way of illustration and example only. For brevity, some alternative modifications of the principles of the invention have been disclosed. For example, while shift registers have been disclosed in the illustrative embodiment, still other apparatus may be employed and still other modifications of the principles of this invention will occur to those skilled in the art. Accordingly, the invention is not to be considered limited by the embodiment(s) shown and thus the spirit and scope of the invention are limited only by the appended claims.

What is claimed is:

1. A method for controlling digital signals in a communications system, said system including a communications path, a plurality of stations, at least two of said stations being coupled to said path, said method including the steps of writing signals on said path and reading signals from said path and characterized in that said method further comprises the steps of:
responsive to signals read from said path, avoiding a collision on said communications path, said collision avoiding step including
detecting that a first packet, which is received at a first station on said path, has been transmitted from a second station on said path, and
introducing a first predetermined time delay before said first station is permitted to transmit a second packet, said predetermined time delay being related to the electrical distance between said first and said second stations.

2. The method defined in claim 1 wherein said first packet comprises a start-of-cycle packet.

3. The method defined in claim 2 wherein said second packet comprises a start-of-cycle packet.

4. The method defined in claim 1 wherein said second packet comprises a start-of-cycle packet.

5. The method defined in claim 1 wherein said collision avoiding step further comprises the step of:
responsive to said first station detecting said path as being not busy during all of said first predetermined time delay, transmitting said second packet from said first station over said path at the expiration of said first predetermined time delay.

6. The method defined in claim 1 wherein said collision avoiding step further comprises the step of:
responsive to said first station detecting said path as being busy during at least some of said first predetermined time delay, introducing a second predetermined time delay before said first station is permitted to transmit said second packet, said second predetermined delay being related to the electrical distance between said first station and a station which caused said path to be busy.

7. The method defined in claim 6 wherein said collision avoiding step further comprises the step of:
responsive to said first station detecting said path as being not busy during all of said second predetermined time delay, transmitting said second packet from said first station over said path at the expiration of said second predetermined time delay.

8. A communications system including a communications path, a plurality of stations, at least two of said stations being coupled to said path, means for writing signals on said path and means for reading signals from said path and characterized in that said system further comprises:

means for controlling digital signals in said system, said controlling means including means responsive to signals read from said path for avoiding a collision on said communications path, said collision avoiding means including means for detecting that a first packet, which is received at a first station on said path, has been transmitted from a second station on said path, and means for introducing a first predetermined time delay before said first station is permitted to transmit a second packet, said predetermined time delay being related to the electrical distance between said first and said second stations.

9. The system defined in claim 8 wherein said first packet comprises a start-of-cycle packet.

10. The system defined in claim 9 wherein said second packet comprises a start-of-cycle packet.

11. The system defined in claim 8 wherein said second packet comprises a start-of-cycle packet.

12. The system defined in claim 8 wherein said collision avoiding means further comprises:

means, responsive to said first station detecting said path as being not busy during all of said first predetermined time delay, for transmitting said second packet from said first station over said path at the expiration of said first predetermined time delay.

13. The system defined in claim 8 wherein said collision avoiding means further comprises:

means, responsive to said first station detecting said path as being busy during at least some of said first predetermined time delay, for introducing a second predetermined time delay before said first station is permitted to transmit said second packet, said second predetermined delay being related to the electrical distance between said first station and a station which caused said path to be busy.

14. The system defined in claim 13 wherein said collision avoiding means further comprises:

means, responsive to said first station detecting said path as being not busy during all of said second predetermined time delay, for transmitting said second packet from said first station over said path at the expiration of said second predetermined time delay.

15. Station apparatus for controlling digital signals, said station adapted to be coupled to a communications path, said station including means for writing signals on said path and means for reading signals from said path and characterized in that said station further comprises:

means responsive to signals read from said path for avoiding a collision on said communications path, said collision avoiding means including means for detecting that a first packet, which is received at said station, has been transmitted from a second station on said path, and means for introducing a first predetermined time delay before said station is permitted to transmit a second packet, said predetermined time delay being related to the electrical distance between said station and said second station.

16. The station defined in claim 15 wherein said first packet comprises a start-of-cycle packet.

17. The station defined in claim 16 wherein said second packet comprises a start-of-cycle packet.

18. The station defined in claim 15 wherein said second packet comprises a start-of-cycle packet.

19. The station defined in claim 15 wherein said collision avoiding means further comprises:

means, responsive to said station detecting said path as being not busy during all of said first predetermined time delay, for transmitting said second packet from said station over said path at the expiration of said first predetermined time delay.

20. The station defined in claim 15 wherein said collision avoiding means further comprises:

means, responsive to said station detecting said path as being busy during at least some of said first predetermined time delay, for introducing a second predetermined time delay before said station is permitted to transmit said second packet, said second predetermined delay being related to the electrical distance between said station and a station which caused said path to be busy.

21. The station defined in claim 20 wherein said collision avoiding means further comprises:

means, responsive to said station detecting said path as being not busy during all of said second predetermined time delay, for transmitting said second packet from said station over said path at the expiration of said second predetermined time delay.

* * * * *